UNITED STATES PATENT OFFICE.

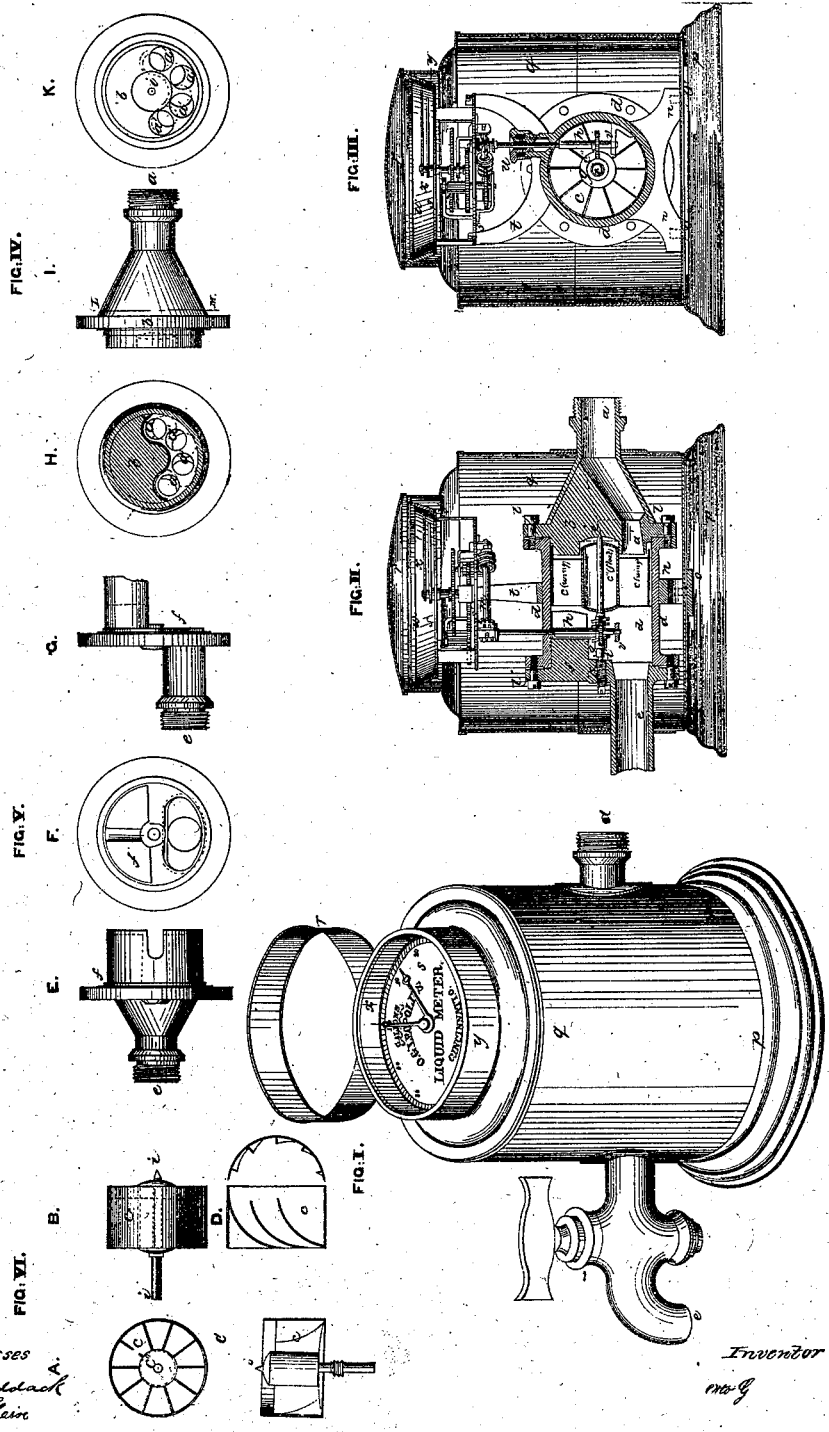
O. G. Leopold,
Rotary Meter,
N° 16,983. Patented Apr. 7, 1857

OTTO G. LEOPOLD, OF CINCINNATI, OHIO.

IMPROVED LIQUID-METER.

Specification forming part of Letters Patent No. 16,983, dated April 7, 1857.

*To all whom it may concern:*

Be it known that I, OTTO G. LEOPOLD, of the city of Cincinnati, in the county of Hamilton and State of Ohio, have invented a new and Improved Apparatus for the purpose of Measuring and Registering Liquids, particularly Water; and I do hereby declare that the following is a full, clear, and exact description of the construction and operation of the same, reference being had to the annexed drawings, and to the letters of reference marked thereon, making a part of this specification, in which—

Figure I is a perspective view; Fig. II, a longitudinal section through the center of the meter; Fig. III, a transverse section through the vertical spindle H, which communicates the motion of the wheel or screw C to the wheel-work of the index. Fig. IV comprises the three different views of the closing head-plate B at the back end of the cylindrical case D, showing the inlet-openings and inlet-pipe, and of which H represents a sectional view, through the line L M, of I, the top view, and K is a view of the inner side of the same, showing the number and arrangement of the inlet-openings. Fig. V comprises the three views of the closing head-plate $f$, at the front end of the cylindrical case D, showing the outlet-opening, and of which E represents the top view; F the inner or back side view showing the conically-enlarged outlet-opening; G, the side view. Fig. VI comprises the four views of the wheel or screw, A representing the end view, showing the number and position of the threads or wings, the tubular inner case or float with its closing end plates, the exterior case, and the spindle or small axis of the wheel; B, the side view; C, a longitudinal section through the center of the wheel, showing the curve of the wings or threads on the tubular inner part or float; and D, also a longitudinal section through the center of the wheel, which, by leaving out the tubular part or float, shows the curve of the wings or threads on the inner periphery of the exterior or inclosing case.

For the purpose of explaining more fully the nature of my invention and to show where it differs from those machines heretofore invented for the accomplishment of the object in view, it would appear appropriate to speak of the principles applied in their practical execution, their deficiencies, and the consequent objections which have prevented their general introduction into usage. Of the two kinds of liquid or water meters, one receives its motion from the pressure in consequence of the height of the supply-column, the other from the weight or gravity of the liquid that is intended to be measured and registered; or, in other words, the one is worked by the pressure and the other by the gravity of the liquid. That kind of liquid or water meter in which the principle of pressure is applied measures and registers the passing liquid by an alternate filling and emptying of buckets or compartments, and therefore requires the packing of the wheel, piston, or that part which, according to the nature of the construction, is employed as the first motor, and which as such or as the measurer, communicates motion to the wheel-work of the index. This packing, of whatever it may consist, but particularly if of leather or india-rubber, is necessarily subjected to a greater or less degree of friction, and the consequent wear and tear must sooner or later injure the correctness of the measurement, however true and minute the meter may have been adjusted. Besides this, the influences of temperature, the non-elasticity of the water, the constantly-varying pressure, and consequently the velocity of the supply, must also necessarily have a tendency to destroy the correctness of the measurement. While the pressure-meters admit the rising of the water to a proportionate height to that of the supply-column, the other kind or gravity-meters do not permit the rising of the water above the level on which the meter is placed, because it is required that the force of the water, when under high pressure, should be broken, in order to proportion and reduce the supply to a standard quantity, such as the meter is capable of passing; or, in other words, a standard and uniform level has to be established, from which the wheel or measurer receives its supply, and thereby its motion, in order to prevent the overflowing of the same. It is therefore necessary to place this kind of meter at the highest point where the water can be wanted with regard to the height of the supply-column; but the inconvenience and expense of an additional length of conducting-pipe caused thereby, the impossibility of applying the meter in cases where the force of the water is wanted, and the difficulty of protecting it against frost when applied outdoors, make the meter unsuitable for general introduction, however simple its construction and accurate its measurement.

The present system of taxing houses in those cities the inhabitants of which depend almost exclusively on the supply of water-works, the uncontrollable waste attending it, the additional expense caused thereby, the necessity of preventing at the same time all abuses by which fraudulent consumers impose on the tax-paying community, have made it desirable to both dispenser and consumer to establish a more equitable mode of taxation. To accomplish this object successfully, the application of a meter seems to be indispensable. I have endeavored therefore to construct an apparatus which at once is much simpler and more perfect in its arrangement, as well as in the mode in which the measurement is effected, than any of the others, and being at the same time more durable and considerably cheaper is doubtlessly better adapted for general introduction.

The inlet-pipe A, to the outer end of which the connection with the supply-pipe is made, is circular and conically-enlarged toward the closing head-plate B, of which it is a part. The upper half of this conically-enlarged inlet-opening is closed, leaving thereby a somewhat semi-conical passage to the liquid, which terminates in an appropriate number of small circular inlet-openings A', by which the liquid is discharged into the case D and upon the wings or threads of the wheel, which is made to revolve close to the same. These holes A' are so arranged and their position to each other as well as to the center line of the meter, is such that the divided stream of the entering liquid strikes the wings of the wheel in an oblique line and at the points of greatest leverage, resembling thereby in its course to the wheel a spiral. The number of these holes, and consequently the diameter of each, is determined by the size of the outlet-orifice, and is proportioned so that the total area of the holes somewhat exceeds the area of the same or that of the conducting-pipe, in order to neutralize the greater friction which liquids sustain in being passed through smaller pipes in comparison with larger ones. By this arrangement of having the inlet-opening at the point of discharge upon the wheel proportionally enlarged and the stream divided the liquid is distributed over a larger area of the wheel, and thereby the increased momentum or impulsive force of the liquid is used to better advantage, and a comparatively smaller wheel is made capable of passing a greater quantity without interfering with the uniformity of its motion under the respective velocities of the passing liquid. The holes also serve to prevent any gross impurities which the water may carry in its course from getting to and settling between the wings of the wheel. On the inner side of the closing head-plate B three offsets are turned, of which the diametrically-largest one serves to make the grounded joint with the case D. The second is made to fit nicely into the case, and the third, or diametrically smallest, leaves, when the head B is attached to the case D, a cylindrical recess wide and deep enough to receive the lap of the inclosing-case of the wheel and to permit its revolving freely and closely. At the center of the head-plate B and on the same inner side another recess or cavity is turned, also wide and deep enough to receive the lap part of the tubular center part or float of the wheel and to permits its free and close revolving. By this arrangement the liquid which enters through the inlet-openings A' is forced to pass in its outward course through the wheel and to strike the wings or threads of the same.

As it is essential for the successful accomplishment of measurement and registry, in the application of the velocity principle, that the wheel or screw should revolve in the precise speed of the passing liquid, it is absolutely necessary to remove as much as possible all friction and to construct the wheel as light and sensitive as possible. In the course of experiments made for the purpose of ascertaining the most suitable form and arrangement of the parts of the wheel, not with a view and in regard to its respective percentage of power, but its greater or less degree of sensitiveness and lightness, it was found that not only certain proportions between width, depth, and the curvative inclination of the wings were to be strictly regarded, but also that the sensitiveness of the wheel and its reciprocal uniformity of motion under the alternate influences of higher or lower pressure and the corresponding velocities of the passing liquid were essentially affected by the manner in which one or the other or both actions of the water or liquid were brought in requisition and made to operate on the wings or threads of the wheel. In due consideration of these observations, as were demonstrated by the variously shaped, arranged, and proportioned wheels employed in my trials, I was induced to adopt, in preference to others, the wheel herein described, and lay full claim to all the rights of priority and the protection and privileges of Letters Patent to which I believe myself to be entitled as the first and original applicant of this or any other similarly-constructed wheel in the construction of an apparatus that purposes to measure and register liquids, particularly water, on the principle of velocity, and in a combination of parts and in a manner similar to the one here specified.

The wheel or screw C of my apparatus is constructed of and comprises four distinct parts.

First, the tubular or hollow cylinder, which forms the base or axis for the threads or wings, and which, being closed at both ends by convex head-plates and made perfectly air-tight, serves as, and in fact is, a float, that, to the extent of the difference in the specific gravities of the bulk of the atmospheric air it contains, and that of the liquid which is displaced by it when the meter is filled, thereby neutralizes or proportionally balances the weight of the metal of which the wheel is composed; or, in other words, its rising or upward tendency, when under water, counteracts the downward proclivity of the metal's weight. By this means the friction is considerably reduced at the points of suspension I and I', and consequently the sensitiveness of the wheel greatly increased, so that the wheel, with the addition of this essential improvement to the peculiarity of form and arrangement of the wings, is made to revolve by the mere impetus of a breath.

Secondly, the wings or threads are in this combination of a curvative shape, radiatingly arranged and fastened to the hollow cylinder or float in a manner resembling the threads of a screw, so as to meet in their extended lines toward the axis of the wheel, with their common center in the center line of the wheel, leaving between its leaves or inclined plates spaces of equal area and shape, each thread or wing covering by its angle of sideward inclination on the circle of the tubular axis, as well as the exterior inclosing-case, its own and either the whole or part of the inlet-opening of the next following wing; or, in other words, the twist of each wing or thread around the axis is such as to bring the radiating line of the one wing at the one end of the wheel either in a directly opposite one of the second following one at the other end of the same or otherwise between the two. The number of wings or threads each wheel is intended to contain in the different sized meters depends on the diameter of the inclosing case in which it is designed to revolve, and which bears a suitable proportion to the diameter of the conducting-pipe. The area of each space or passage between two successive wings should always somewhat exceed the area of each small inlet-opening, so that each passage may pass easily and without any greater friction a proportional quantity of the entering liquid.

Thirdly, the cylindrical case, which incloses the wings or threads, and to which the same are fastened, is perfectly smooth and exactly circular on both inner and outer periphery, preventing thereby, as much as possible, any distortions of the passing liquid, by which the uniformity of motion might be injured, and permitting the free and close revolving of the wheel in the case D, to which it is accurately and with but a slightly-diminished diameter adjusted. Both the exterior or inclosing case and the hollow cylinder or float of the wheel are somewhat deeper than the wings, and form with their respective projections a recess on the back of the wheel, which serves to overlap that portion or offset of the back closing head-plate B, which is intended to direct and pass the current of the passing liquid imme and without any escape sidewise into th and upon its wings.

Fourthly, the small spindle or axis wheel is made of hard metal for the [ of resisting more effectually the influe wear and tear. At the point of suspe the spindle or axis is pointed conicall angle of sixty degrees, with its shar rounded off, and is nicely fitted to a sponding cavity at the center of the bac ing head-plate B. The front or oppos of the axis I' contains a conical cavi base-circle of which is a little wider tl corresponding one of the conically poin slightly-rounded end of the small adjus set screw K, which, passing through t ter of the front closing head-plate F, s the axis and facilitates the easy and i ate adjustment of the wheel in its prop on the revolving points of its axis, prc by this means at the same time the r surfaces of suspension against any imp which the liquid's current might con ward it. The wheel, as a matter of should be well balanced on its centers pension—that is, the weight should be distributed over all parts of the swing cle of the wheel, and thereby the tend stopping always at a certain point of i lution obviated when the wheel is gen in motion. For reasons which will be understood from the nature of the ap the wheel should be executed with still accuracy and nicety than the general ter of the meter requires in its other p As already mentioned, this meter d require any packing of the wheel or me and therefore will preserve the correc the first adjustment under any pressur passing liquid and as long as the revol the wheel is preserved, because the m ment and registry are obtained by insert the flow or stream of the liquid a fric and highly-sensitive wheel, which is revolve in the exact proportion to the v under which the liquid passes; and i established axiom of science, "veloc efflux) proportioning quantity," insu correctness of measurement in the mann adopted and described. From the ac the liquid upon the wings or threads wheel, from the principle involved, a general arrangement of the apparatus be easily inferred that no interference with regard to the current or the velocit passing liquid, since the wheel constan instantly gives way to the mere impetu flow of the passing liquid. This assert been fully demonstrated by actual trial for that purpose. A barrel of forty-two was repeatedly filled, both with and the meter attached, the head-pressure ing the same, and the pipe employed outlet-orifice of five-eighths of an incl eter, and in both instances the result w gard to time was the same, (two minu about thirty seconds.) These trials were repeated in various elevations of e e a forty feet up to a point where but ten-feet head-pressure remained, and the results proved the same as before under a proportioned difference in the time of filling to the height of the supply. Another series of trials with a mouth-piece similar to the one used in the fire-engine department, and in which a jet of water was thrown, showed the same effect in both instances under the same conditions as before. In the progress of these trials the fact also made itself apparent that the position of the meter, either in a horizontal or vertical line, had no effect on the proper actions of the meter, and that it therefore is equally well applicable in either position, which may be most convenient for attachment and protection against frost, for hydrant purposes. That the points of suspension are not exposed to any heat and consequent destruction, caused by the rapid motion of the wheel under a high velocity of the passing water, is obvious, for the surrounding water acts lubricatingly, and thereby preserves the same.

By means of the worm G on the front end of the wheel's axis the vertical spindle H receives it and communicates motion to the wheel-work of the index. This spindle is supported at its lower end by an angular piece, V, which is fitted and fastened to the inner periphery of the inclosing case D. At its upper end this spindle passes through the case D and receives support from a small stuffing-box, U, which is made to pack the joint. Buckskin or any other suitable material may be employed for this purpose. Both the wheel or screw C and the spindle H, with its small tooth-wheel, are inclosed by the cylindrical case D, which forms, and is, in fact, but an enlarged part of the conducting-pipe. Its diameter, and thereby its proportional length, is determined by the size of the outlet-opening. (The diameter of the case for the five-eighth-inch outlet-opening is one and three fourth inch by two inches long.) The inner periphery of this cylindrical case presents a perfectly smooth and exactly circular surface. Both ends of the case are closed by head-plates, which are jointed by means of grinding, and fastened to the flanges of the case by an appropriate number of small screws or bolts L. The closing head-plate F at the front end of the case D is similar to the back one, and contains the outlet-opening, conically enlarged at its mouth for the purpose of facilitating the free egress of the liquid from the case D and of avoiding as much as possible all reaction caused by the counter-pressure of the liquid upon the wheel, and also the circular short outlet-pipe E, or, as the case may be, the substituted faucet. The head-plate F is nicely fitted and fastened to the case D, so as to bring its outlet-opening in a directly-opposite position to the inlet-openings of the back closing head-plate B, and to fill up the upper half of the space, which is formed by the case D at the front of the wheel by its solid semi[c] shaped part, leaving thereby a semi passage for the liquid in the case D f wheel to the enlarged mouth of the opening. This arrangement is for the of preventing as much as possible the c of "standing" or "dead" water, so call the fact that the surplus water or liqui fills the case D when the meter is at while the outlet-opening remains shut chance of getting away when the flo liquid is caused by the opening of th orifice, because since the pressure of tl column necessarily must cause a full stant supply to the meter, and both sup outlet pipe are of the same diameter, vious that the quantity of liquid pass the meter is instantly and fully sup the inlet. The resisting force of this water proved fatal to the free and easy ing of the wheel, and therefore to its se ness, whenever the liquid passes unde velocity. From this observation the sion may be drawn that those passages the wheel, if left open to the straight c the passing liquid, are to the extent an portion to the pressure packed by th itself. The two circular plates S and constitute the frame for the wheel-wor index, and which are connected at an priate distance by small columns in a similar to the frame of a common cl carried by and screwed to the simicircu rup T. This stirrup is supported by ened to the top of the case D, so as the horizontal spindle M, with its tootl properly geared with the worm of the spindle H. The motion of the wheel received by the spindle H is thus tra to the horizontal spindle M, which co cates the same directly to the wheel-the index and thereby to the hands of The dial-plate contains the scale, the d of which may be extended to any desir tity, each small division designating tl tity of a standard gallon-measure.

The whole machinery, meter as wel dex, is inclosed and protected by a cyl case, which consists of three parts— tom piece, P, to which the meter is by means of the foot piece N, and small screws O and O', and which is p with a rim or flange that serves to rec hold the upper part or box Q of the ca ing exposed only the inlet and outle The top of this box Q terminates in what smaller rim or offset, Y, sufficien and of a little larger diameter than th the brass ring H, which holds the gla W and incloses and protects the dial hands of the index. This brass ring is to the dial-plate by means of small catc may be easily removed by turning around until one of those catches has the cavity or flat made on the circle dial-plate, for the purpose of setting t two catches in.

For the purpose of protecting the glass plate, and more particularly to prevent outsiders from intermeddling with the hands of the index, which are movable on their centers, a convex cover, R, is hinged and fastened to the rim or offset Y, and may, if desired, be locked, so that none but the officers of the water-works may have free access for inspection.

Having thus fully described the construction of the apparatus, I wish it to be understood that I neither confine myself to the materials employed, nor to the particular form or arrangement of the several parts of which the same consists, provided the wheel or drum is peculiarly adapted to the registering of the flow of liquids; but

I claim—

1. Suspending the wheel or drum in the manner described and floating it, so as to reduce the friction of its bearings to the smallest possible amount, and thus, in addition to the other means hereinbefore described, rendering it peculiarly adaptable to the registering of the flow of liquids.

2. The arrangement of dividing the inlet-opening into an appropriate number of small apertures, so as to protect the wheel from the gross impurities of the water, and thus preventing its free motion from being disturbed.

OTTO G. LEOPOLD.

Attest:
ALEX. PADDOCK,
CHR. FLEISE.